(12) United States Patent
O'Connor

(10) Patent No.: US 8,284,740 B2
(45) Date of Patent: Oct. 9, 2012

(54) TECHNIQUES TO SHARE MULTIMEDIA AND ENABLE CELLULAR PHONE CONFERENCE CALLING USING AD-HOC WIRELESS NETWORKS

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 11/637,269

(22) Filed: Dec. 11, 2006

(65) Prior Publication Data
US 2008/0139239 A1     Jun. 12, 2008

(51) Int. Cl.
*H04W 4/00*  (2009.01)
*H04B 7/15*  (2006.01)

(52) U.S. Cl. ..................... 370/338; 455/11.1
(58) Field of Classification Search .......... 370/338, 370/329, 401, 337, 442; 455/445, 552.1, 455/435.1, 11.1, 41
See application file for complete search history.

(56) References Cited

U.S. PATENT DOCUMENTS

| | | | |
|---|---|---|---|
| 7,039,031 B1 * | 5/2006 | Joeressen | 370/337 |
| 7,305,239 B2 * | 12/2007 | Pregont | 455/445 |
| 7,466,991 B2 * | 12/2008 | Everson et al. | 455/552.1 |
| 2002/0146981 A1 * | 10/2002 | Saint-Hilaire et al. | 455/41 |
| 2005/0286466 A1 * | 12/2005 | Tagg et al. | 370/329 |
| 2007/0010248 A1 * | 1/2007 | Dravida et al. | 455/435.1 |
| 2008/0102843 A1 * | 5/2008 | Todd et al. | 455/445 |

* cited by examiner

*Primary Examiner* — Dwayne Bost
*Assistant Examiner* — Kuo Woo
(74) *Attorney, Agent, or Firm* — Kacvinsky Daisak, PLLC

(57) ABSTRACT

An embodiment of the present invention provides an apparatus, comprising a wireless handset operable in a wireless wide area network (WWAN) and a wireless local area network (WLAN) and wherein the wireless handset is adapted to transmit and receive voice and/or data communications from at least one voice or data communication device via the WLAN and incorporate the voice or data communications into communications over the wireless wide area network.

26 Claims, 2 Drawing Sheets

TECHNIQUES TO SHARE MULTIMEDIA AND ENABLE CELLULAR PHONE CONFERENCE CALLING USING AD-HOC WIRELESS NETWORKS

BACKGROUND

Currently, mobile phone users who are co-located and wish to conference must either use a speakerphone, all dial in to a "bridge" facility, or can use the limited ability of "2-way calling" that some mobile phones may have. Speakerphones result in low-quality audio. Using a bridge incurs additional cost, and often has to be set up in advance. Two-way calling limits the number of participants.

Thus, a strong need exists for techniques to share multimedia and enable cellular phone conference calling using ad-hoc wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
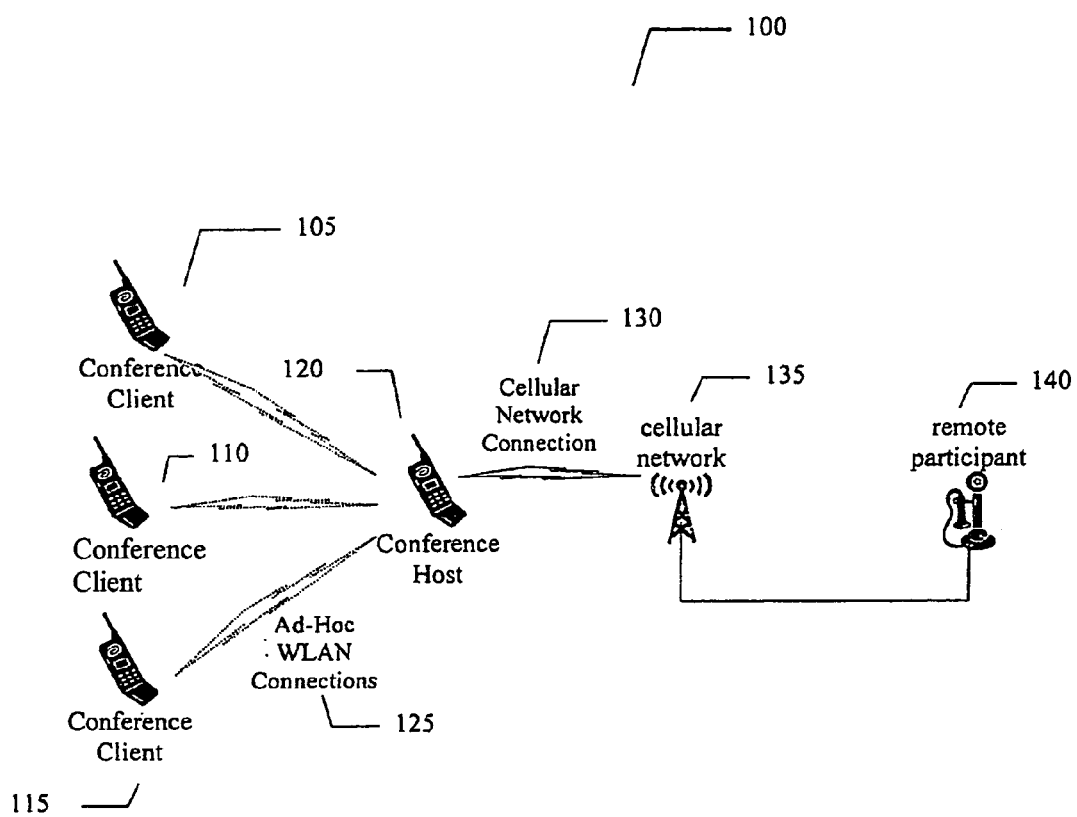
FIG. 1 illustrates an apparatus and system of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth™, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

In a wireless handset, such as, but not limited to, a wireless mobile (also may be referred to as cellular) phone with both a wireless wide area network (WWAN), such as, but not limited to a cellular network, and a wireless local area network (WLAN), such as, but not limited to, a network in conformity with the Institute for Electronics and Electrical Engineers (IEEE) 802.11 standard (also may be referred to herein as WiFi) connection, a user could choose to let other WiFi-enabled cell phone users in the local area join in a call on the wireless handset's WWAN (e.g., cellular network) via ad-hoc peer-to-peer WiFi connections. Because this is a peer-to-peer connection, no WiFi hotspot is required.

In an embodiment of the present invention, alternatively, a personal area network, such as one in conformity with the Bluetooth® wireless standard, could be used. Again, it is understood that any local area or personal area network may be used in some embodiments of the present invention. The "host" cellular phone may mix the audio from all of the conferenced mobile phones and send it upstream into the WWAN (e.g., cellular) operators network as a single phone call.

In an embodiment of the present invention, joining the call may be controlled by, for example, a pass-phrase distributed by the person hosting the conferencing, or by the host cell phone prompting its user with an identifier (like the phone number) for a cell phone attempting to connect to the call and asking if it should be allowed to join. Security of the conference from electronic eavesdropping would be accomplished by encrypting the voice traffic.

Cellular network operators, since, they control the firmware in the phone, might charge more (for example, 2 minutes charged per minute of conferencing) for a conference call of this nature than for a normal call—although the present invention is not limited in this respect. By defining a standard for this functionality, cellular phones from different operators could all conference together. This would allow people to join a conference call even in places where their cellular provider does not provide service, so long as someone else can get service.

The mobile phone hardware would have to support simultaneous cellular and WLAN connections, for example in one embodiment of the present invention, and be able to handle the mixing and distribution of audio between the two networks. In an embodiment of the present invention, multimedia content beyond voice could also be shared via an embodiment of the present invention.

Looking now at the figures, FIG. 1, shown generally as 100, is an apparatus and system according to one embodiment of the present invention. A wireless handset may act as a conference host 120 and may be in wireless communication with a WWAN infrastructure via a WWAN network. In an embodiment of the present invention the WWAN may be a cellular network connection 130 and the WWAN infrastructure may be a cellular network 135 in communication with a remote participant. Further, conference host 120 may be in communication via an Ad-Hoc WLAN connection 125 with conference clients 105, 110 and 115.

Figure 2:
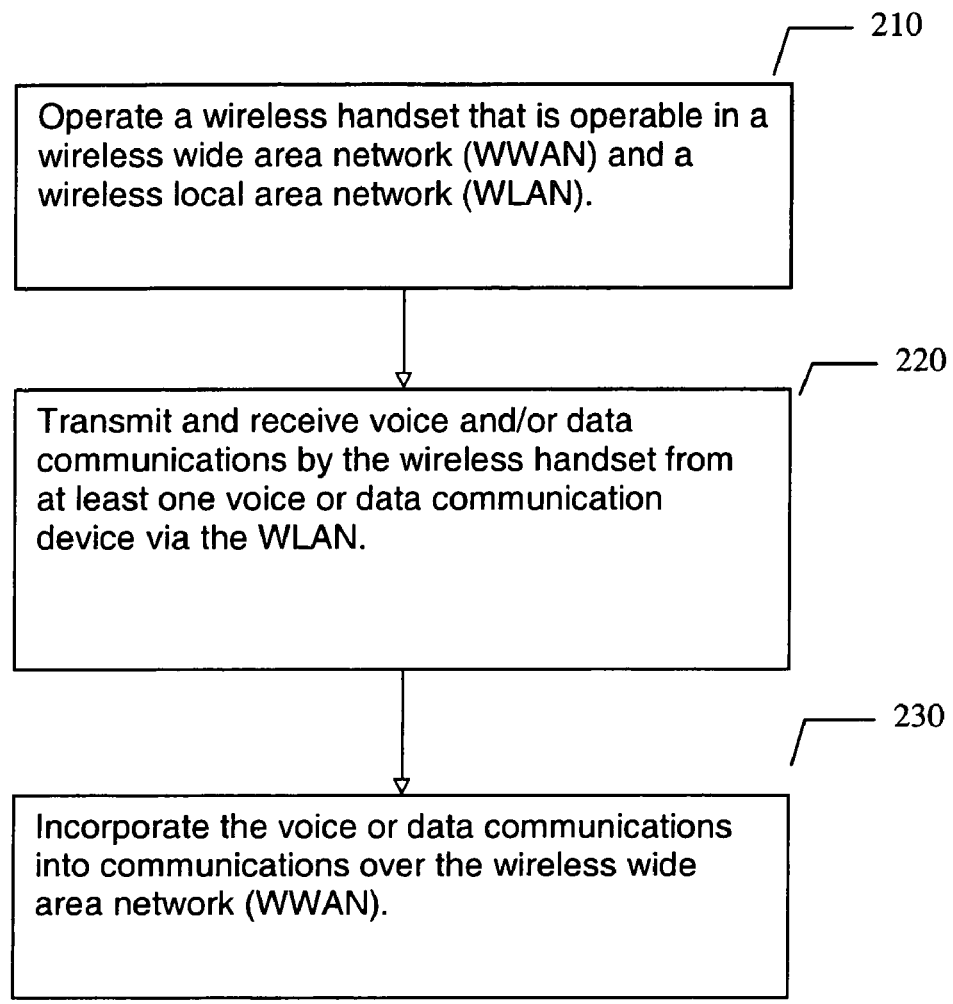
FIG. 2 is a flowchart of the method of an embodiment of the present invention.

Looking now at FIG. 2 is a method according to an embodiment of the present invention and provides operating a wireless handset that is operable in a wireless wide area network (WWAN) and a wireless local area network (WLAN) 210 and transmitting and receiving voice and/or data communications by said wireless handset from at least one voice or data communication device via said WLAN 220 and incorporating said voice or data communications into communications over said wireless wide area network (WWAN) 230. In an embodiment of the present invention the wireless wide area network (WWAN) may be a cellular network and the wireless local area network (WLAN) may be a network conforming to the Institute for Electronics and Electrical Engineers (IEEE) 802.11 standard. In a method according to one embodiment of the present invention, the at least one voice or data communications device is at least one additional wireless handset operable in said 802.11 WLAN and may further comprise operating said wireless handset in a Bluetooth standard wireless personal area network (WPAN) and wherein said wireless handset is adapted to transmit and receive voice and/or data communications from said at least one voice or data communication device via said WPAN and incorporate said voice or data communications into communications over said WWAN. An embodiment of the present method may further comprise mixing the audio from said at least one voice or data communications device and sending it upstream into a WWAN operator's network as a single WWAN transmission to create a conference call environment.

Some embodiments of the present invention may be implemented, for example, using a machine-readable medium or article which may store an instruction or a set of instructions that, if executed by a machine, for example, by the system of FIG. 1, by wireless handset 120, in communication with cellular network 135, by a processor (not shown), or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

In an embodiment of the present invention the machine-accessible medium that provides instructions, which when accessed, may cause the machine to perform operations comprising operating a wireless handset that is operable in a wireless wide area network (WWAN) and a wireless local area network (WLAN) and transmitting and receiving voice and/or data communications by said wireless handset from at least one voice or data communication device via said WLAN and incorporating said voice or data communications into communications over said wireless wide area network (WWAN).

Some embodiments of the present invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

I claim:
1. An apparatus, comprising:
a wireless handset simultaneously operable in a wireless wide area network (WWAN) and at least one short-range wireless network, wherein said wireless handset is adapted to transmit and receive voice and/or data communications from at least one voice or data communication device via said at least one short-range wireless network and incorporate said voice or data communications into a single transmission over said (WWAN), wherein wireless handset mixes audio from said at least one voice or data communications device and sends it upstream into a WWAN as a single WWAN transmission, wherein said wireless handset is adapted to share voice or data communications from said (WWAN) to at least one voice or data communication device via said at least one short-range wireless network, and wherein said wireless handset distributes audio or data communications from the WWAN to said at least one voice or data communication device over said at least one short-range wireless network, to create a conference call environment.

2. The apparatus of claim 1, wherein said wireless wide area network (WWAN) is a cellular network.

3. The apparatus of claim 1, wherein said at least one short-range wireless network is a network conforming to the Institute for Electronics and Electrical Engineers (IEEE) wireless local area network (WLAN) 802.11 standard.

4. The apparatus of claim 1, wherein said at least one voice or data communications device is at least one additional wireless handset operable in said 802.11 WLAN.

5. The apparatus of claim 1, wherein said at least one short-range wireless network is a network conforming to the Bluetooth wireless personal area network (WPAN) standard.

6. The apparatus of claim 1, wherein joining the conference call by additional voice or data communication devices would be controlled a pass-phrase distributed by a person hosting the conferencing, or by a host wireless handset prompting its user with an identifier for at least one additional voice or data communications device attempting to connect to the call and asking if it should be allowed to join.

7. The apparatus of claim 1, wherein security of the conference from electronic eavesdropping would be accomplished by encrypting the voice traffic.

8. The apparatus of claim 1, wherein said voice or data communications is transmission of multimedia.

9. A method, comprising:
operating a wireless handset that is simultaneously operable in a wireless wide area network (WWAN) and at least one short-range wireless network; and
transmitting and receiving voice and/or data communications by said wireless handset from at least one voice or data communication device via said at least one short-range wireless network and incorporating said voice or data communications into a single transmission over said (WWAN), mixing audio from said at least one voice or data communications device and sending it upstream into WWAN as a single WWAN transmission,
wherein said wireless handset distributes audio or data communications from the WWAN to said at least one voice or data communication device over said at least one short-range wireless network, to create a conference call environment.

10. The method of claim 9, wherein said wireless wide area network (WWAN) is a cellular network.

11. The method of claim 9, wherein said at least one short-range wireless network is a network conforming to the Institute for Electronics and Electrical Engineers (IEEE) 802.11 standard.

12. The method of claim 9, wherein said at least one voice or data communications device is at least one additional wireless handset operable in said 802.11 WLAN.

13. The method of claim 9, wherein said at least one short-range wireless network is a network conforming to the Bluetooth wireless personal area network (WPAN) standard.

14. The method of claim 9, further comprising controlling joining the conference call by additional voice or data communication devices by using a pass-phrase distributed by a person hosting the conferencing, or by a host wireless handset prompting its user with an identifier for at least one additional voice or data communications device attempting to connect to the call and asking if it should be allowed to join.

15. The method of claim 9, further comprising encrypting said voice or data communications.

16. A non-transitory machine-accessible medium that provides instructions, which when accessed, cause a machine to perform operations comprising:
operating a wireless handset that is simultaneously operable in a wireless wide area network (WWAN) and at least one short-range wireless network; and
transmitting and receiving voice and/or data communications by said wireless handset from at least one voice or data communication device via said WLAN and incorporating said voice or data communications into a single transmission over said (WWAN), instructions causing said machine to perform operations further comprising mixing audio from said at least one voice or data communications device and sending it upstream into said WWAN as single WWAN transmission,
wherein said wireless handset distributes audio or data communications from the WWAN to said at least one voice or data communications device over said at least one short-range wireless network, to create a conference call environment.

17. The machine-accessible medium of claim 16, wherein said wireless wide area network (WWAN) is a cellular network.

18. The machine-accessible medium of claim 16, wherein said at least one short-range wireless network is a network conforming to the Institute for Electronics and Electrical Engineers (IEEE) 802.11 wireless local area network (WLAN) standard.

19. The machine-accessible medium of claim 16, wherein said at least one voice or data communications device is at least one additional wireless handset operable in said 802.11 WLAN.

20. The machine-accessible medium of claim 16, wherein said at least one short-range wireless network is a network conforming to the Bluetooth wireless personal area network (WPAN) standard.

21. The machine-accessible medium of claim 16, further comprising said instructions causing said machine to perform operations further comprising controlling joining the conference call by additional voice or data communication devices by using a pass-phrase distributed by a person hosting the conferencing, or by a host wireless handset prompting its user with an identifier for at least one additional voice or data communications device attempting to connect to the call and asking if it should be allowed to join.

22. A system, comprising:
a first wireless handset simultaneously operable in a wireless wide area network (WWAN) and at least one short-range wireless network;
a second wireless handset adapted to communicate voice or data to said first wireless handset via at least said at least one short-range wireless network, wherein said first wireless handset incorporates said voice or data from said second wireless handset into a single transmission over said WWAN, said wherein first wireless handset mixes audio from said second wireless handset and sends it upstream into said WWAN as a single WWAN transmission, and wherein said wireless handset distributes audio or data communications from the WWAN to said at least one voice or data communications device over said at least one short-range wireless network, to create a conference call environment.

23. The system of claim 22, wherein said wireless wide area network (WWAN) is a cellular network.

24. The system of claim 22, wherein said wireless at least one short-range wireless network is a network conforming to the Institute for Electronics and Electrical Engineers (IEEE) 802.11 wireless local area network (WLAN) standard.

25. The system of claim 24, wherein said first and second wireless handsets are further operable in a Bluetooth standard wireless personal area network (WPAN) and wherein said first and second wireless handsets are adapted to communicate voice and/or data communications via said WPAN and incorporate said voice or data communications into communications over said WWAN.

26. The system of claim 22, wherein said voice or data communications is transmission of multimedia.

* * * * *

UNITED STATES PATENT AND TRADEMARK OFFICE
CERTIFICATE OF CORRECTION

| | |
|---|---|
| PATENT NO. | : 8,284,740 B2 |
| APPLICATION NO. | : 11/637269 |
| DATED | : October 9, 2012 |
| INVENTOR(S) | : Dennis M. O'Connor |

It is certified that error appears in the above-identified patent and that said Letters Patent is hereby corrected as shown below:

In column 7, line 3, in claim 22, delete "said wherein" and insert -- wherein said --, therefor.

In column 8, line 1, in claim 24, delete "said wireless" and insert -- said --, therefor.

Signed and Sealed this
Nineteenth Day of March, 2013

Teresa Stanek Rea
*Acting Director of the United States Patent and Trademark Office*